United States Patent
Watanabe et al.

[11] Patent Number: 6,097,169
[45] Date of Patent: Aug. 1, 2000

[54] STITCH MACHINING METHOD BY INDUSTRIAL ROBOT

[75] Inventors: Atsushi Watanabe, Minamitsuru-gun; Tetsuaki Kato, Hadano; Toru Shirahata; Atsuo Nagayama, both of Oshino-mura, all of Japan

[73] Assignee: Fanuc Ltd, Minamitsura-gun, Japan

[21] Appl. No.: 09/051,534

[22] PCT Filed: Aug. 13, 1997

[86] PCT No.: PCT/JP97/02827

§ 371 Date: Apr. 13, 1998

§ 102(e) Date: Apr. 13, 1998

[87] PCT Pub. No.: WO98/06545

PCT Pub. Date: Feb. 19, 1998

[30] Foreign Application Priority Data

Aug. 13, 1996 [JP] Japan ................................. 8-229437

[51] Int. Cl.[7] ..................................... B25J 15/02
[52] U.S. Cl. .................. 318/568.21; 112/158 E; 318/567; 364/474.28; 219/124.34
[58] Field of Search ................. 318/567, 568.1, 318/568.11, 568.18, 568.25, 576, 568.21; 364/474.28, 513; 219/124.34, 125.1; 395/80, 93; 112/158 E, 121.14; 901/99, 651, 672

[56] References Cited

U.S. PATENT DOCUMENTS

| | | | |
|---|---|---|---|
| 4,647,753 | 3/1987 | Nakashima et al. | 219/125.1 |
| 4,742,207 | 5/1988 | Nakashima et al. | 219/125.1 |
| 5,079,491 | 1/1992 | Nose et al. | 318/568.11 |
| 5,381,743 | 1/1995 | Moll . | |
| 5,461,700 | 10/1995 | Kimura et al. | 395/80 |
| 5,524,813 | 6/1996 | Pease | 228/212 |
| 5,582,750 | 12/1996 | Hamura et al. | 219/124.34 |
| 5,748,854 | 5/1998 | Watanabe et al. | 395/93 |

FOREIGN PATENT DOCUMENTS

| | | |
|---|---|---|
| 3-60987 | 3/1991 | Japan . |
| 6-511395 | 12/1994 | Japan . |

*Primary Examiner*—Robert E. Nappi
*Assistant Examiner*—Rita Leykin
*Attorney, Agent, or Firm*—Staas & Halsey LLP

[57] ABSTRACT

A stitch machining method by an industrial robot capable of performing a teaching operation easily and the stitch machining accurately. Instead of teaching switchover points p1, P2, . . . for application and non-application of sealant in sealing as shown in FIG. 5a, a distance n1 of a machining section (where sealant is applied) and a distance n2 of a non-machining section are set to a robot controller as shown in FIG. 5b. The robot controller monitors a travel distance and switches from machining to non-machining and vice versa each time the robot travels the distance n1 and the distance n2, respectively, to thereby effect the stitch machining. As shown in FIGS. 5c and 5g, it is possible to ensure that a start and an end points of each block are positioned in the machining sections n1. Further, as shown in FIG. 5d, the stitch machining can be performed continuously for a plurality of blocks. As shown in FIG. 5f, the stitch machining can be performed in each block with a set number of cycles of machining and non-machining.

12 Claims, 5 Drawing Sheets

STITCH MACHINING METHOD BY INDUSTRIAL ROBOT

TECHNICAL FIELD

The present invention relates to a stitch machining method for intermittently machining a workpiece.

BACKGROUND ART

In performing a machining operation such as sealing, welding and coating using an industrial robot, there is known a stitch machining in which a robot controller intermittently issues machining start and stop commands at regular intervals to a peripheral device for performing such machining to thereby intermittently perform the machining operation such as sealing, welding and coating. In the case of sealing, a sealing gun is attached to a wrist at a distal end of a robot arm, and the stitch machining is performed in such manner that on/off commands for applying sealant are issued to a sealing gun controller intermittently while a robot is operating, to thereby apply sealant to a workpiece along a robot traveling path (sealing gun traveling path) intermittently. Also, in the case of arc welding, there is known stitch machining in which welding is performed intermittently by a welding torch attached to a wrist at a distal end of a robot arm. Further, in the case of coating by a robot, there is known stitch machining in which coating is performed intermittently by intermittently projecting coating material from a coating gun.

Figure 5A:
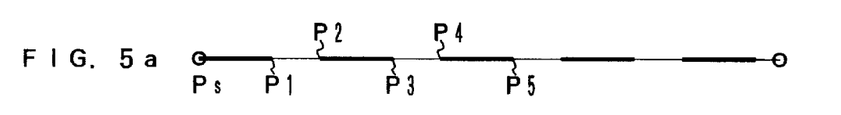
FIGS. 5a–5g are schematic diagrams for showing stitch actions.

Conventionally, in such stitch machining, for example, in sealing, commands designating a start position of an application of sealant and a stop position of the application of sealant are taught by turns, and also commands designating a start of application of sealant and a stop of the application of sealant by turns. For example, as shown in FIG. 5a, a taught program for the stitch machining is prepared to contain a motion command to a sealing start position Ps, an application of sealant start command, a motion command to an application of sealant stop position P1, an application of sealant stop command, a motion command to an application of sealant start position P2, an application of sealant start command, a motion command to an application of sealant stop position P3, . . . in this order.

As is understood from the above, in order to perform the stitch machining, a large number of points (on/off switching positions of application of sealant, on/off switching positions of welding, on/off switching positions of application of coating material) need to be taught. Further, in order to maintain regular on/off intervals, on/off switching positions have to be taught accurately. Furthermore, there is a problem that when an on-section (a section where sealant is to be applied, a section where welding is to be performed, a section where coating material is to be applied) or an off-section (a section where sealant is not to be applied, a section where welding is not to be performed, a section where coating material is not to be applied) which have been taught are to be changed, the on/off switching points need to be taught again. There is another problem that a large memory is necessary for storing the taught program since a large number of points are taught.

Further, since a short action of the on-section and a short action of the off-section are repeatedly executed, there may happen cases where processing for planning a following path can not be performed in time, so that the traveling speed of the end effector attached to the wrist of the robot decreases. Thus, this causes a problem that a distance (of the on-section or the off-section) larger than a certain value can not be taught in dependence on a throughput of a robot controller.

DISCLOSURE OF INVENTION

An object of the present invention is to remedy the above problems and to provide a stitch machining method by an industrial robot capable of performing a teaching operation easily and the stitch machining accurately.

According to the present invention, a machining distance and a non-machining distance are set to a robot controller for the intermittent machining with a cycle of machining and non-machining, and machining of the set machining distance and non-machining of the set non-machining distance are alternately performed in accordance with a travel distance of an end effector from a beginning of the stitch machining. The intermittent machining comprising machining and non-machining may be performed for each block of a motion command in an operation program, or may be performed continuously from a beginning to an end of the stitch machining for a plurality of blocks.

Further, a machining distance and a non-machining distance are set to the robot controller, or alternatively, a ratio of the machining distance to the non-machining distance and the number of cycles of the intermittent machining are set to the robot controller. The set machining distance and non-machining distance are adjusted so that movement in each block in an operation program is completed with the set number of cycles of the machining and non-machining, or alternatively, the set ratio is adjusted so that such machining and non-machining distances are obtained. With the above arrangement, the set number of times of the machining and non-machining can be alternately performed during movement in each block.

Furthermore, an end point of each block can coincide with an end of the machining by adjusting the machining distance and the non-machining distance so that the start and end points of each block are starting and end points of the machining, respectively.

The stitch machining of the present invention can be applied to sealing for applying sealant on a workpiece, welding, or coating for applying coating material on a workpiece.

In order to resume the stitch machining after a temporary stop or an emergency stop, status of the stitch machining is stored. Even if the stitch machining is stopped due to the temporary stop or the emergency stop, it can be resumed based on the stored status of the stitch machining.

BEST MODE OF CARRYING OUT THE INVENTION

A stitch machining method for intermittently applying sealant to a workpiece along a robot traveling path (sealing gun traveling path) by a sealing gun attached to a wrist at a distal end of an robot arm will be described as an embodiment of the present invention.

Figure 5B:
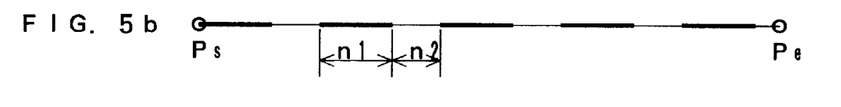

First, the essentials of the present invention will be described. In the present invention, as shown in FIG. 5b, a distance n1 of an on-section (a section where sealant is to be applied) and a distance n2 of an off-section (a section where sealant is not to be applied) are set. When a stitch command is issued according to a taught program, application of sealant starts from a start point Ps of a block of a motion command associated with the stitch command, and continues while a robot (a sealing gun) travels the set on-section (n1). When the robot traveled the distance n1 of the on-section, the application of sealant is stopped. After that, when the robot has traveled the distance n2 of the set off-section, the application of sealant is restarted and sealant is applied for the set on-section. Such actions are repeated thereafter, so that sealant is applied intermittently, as shown in FIG. 5b, along the robot traveling path in the block which is associated with the stitch command.

As shown in FIG. 5b, there may be a case where sealant is not applied at the end point Pe of the block. In consideration thereof, an automatic end point adjusting function is provided according to the present embodiment. When that function is chosen, the set distance n1 of the on-section and the set distance n2 of the off-section are changed so that the application of sealant ends at the end point Pe of the block. This can be done as follows: A distance Q from the start point Ps to the end point Pe of the block which is associated with the stitch command is divided by a distance (n1+n2) of one cycle of on- and off-sections to obtain an integral quotient M. Then, the distance of one cycle of on-section with sealant application and off-section without sealant application is adjusted so that the remaining distance when the cycle of on- and off-sections is repeated M times is of the on-section. That is, $$Q/(n1+n2)=M \ldots \text{remainder } \alpha \tag{1}$$

$$Q/[(n1+n2)]\cdot x]=M \ldots \text{remainder } n1\cdot x \tag{2}$$

From the equation (2), $$x=Q/[M(n1+n2)+n1] \tag{3}$$

Therefore, the adjusted distance n1' of the on-section is expressed as follows:

$$n1'=n1\cdot x=n1\cdot Q/[M(n1+n2)+n1] \tag{4}$$

and the adjusted distance n2' of the off-section is expressed as follows:

$$n2'=n2\cdot x=n2\cdot Q/[M(n1+n2)+n1] \tag{5}$$

Figure 5C:
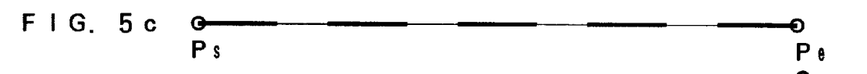

If the respective distances of on- and off-sections are adjusted as expressed above, the on-section with sealant application ends at the end point Pe, so that both the start point and the end point of the block associated with the stitch command are applied with sealant, as shown in FIG. 5c.

Figures 5D, 5E, 5F, 5G:
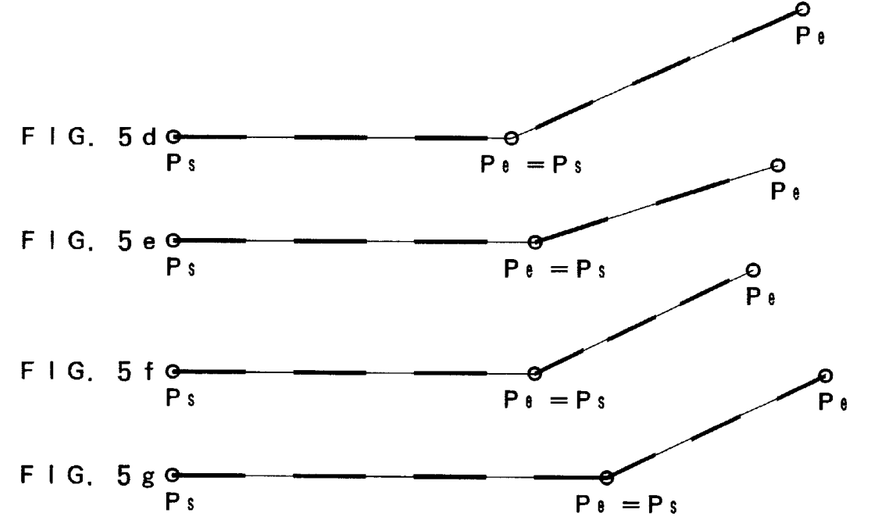

According to the present embodiment, a continuous stitch function is also provided for performing stitch machining over traveling sections consist of a plurality of blocks. With the continuous stitch function, sealant is applied and not applied with the same on/off cycle over a plurality of blocks, as shown in FIG. 5d.

Further, in the present embodiment, a set-number-of-cycles stitch function for ensuring that the stitch machining for one block with the stitch command is completed with a set number of on/off cycles. This function is hereinafter referred to as "K-cycles stitch function", where K represents the set number of cycles. The distances of on-section and off-section of this function are respectively obtained from the distances n1 and n2 of the set on- and off-sections as follows:

$$Q/[(n1+n2)\cdot x]=K \tag{6}$$

$$x=Q/[(n1+n2)\cdot K] \tag{7}$$

Therefore, the adjusted distance n1' of the on-section is expressed as follows:

$$n1'=n1\cdot x=n1\cdot Q/[(n1+n2)\cdot K] \tag{8}$$

and the adjusted distance n2' of the off-section is expressed as follows:

$$n2'=n2\cdot x=n2\cdot Q/[(n1+n2)\cdot K] \tag{9}$$

Alternatively, the K-cycle stitch function can be effected by setting the number K of on/off cycles and a ratio of the distance of the on-section to the distance of the off-section. When the ratio a=n1/n2 is given, the distances n1 and n2 are obtained as follows:

$$Q/K=n1+n2=n2(1+a) \tag{10}$$

$$n2=Q/[K\cdot(1+a)] \tag{11}$$

$$n1=a\cdot Q/[K\cdot(1+a)] \tag{12}$$

It is to be noted that when (n1/n2) is substituted for a in the equations (11) and (12), the equations (11) and (12) become identical with the equations (9) and (8), respectively.

Figure 4:
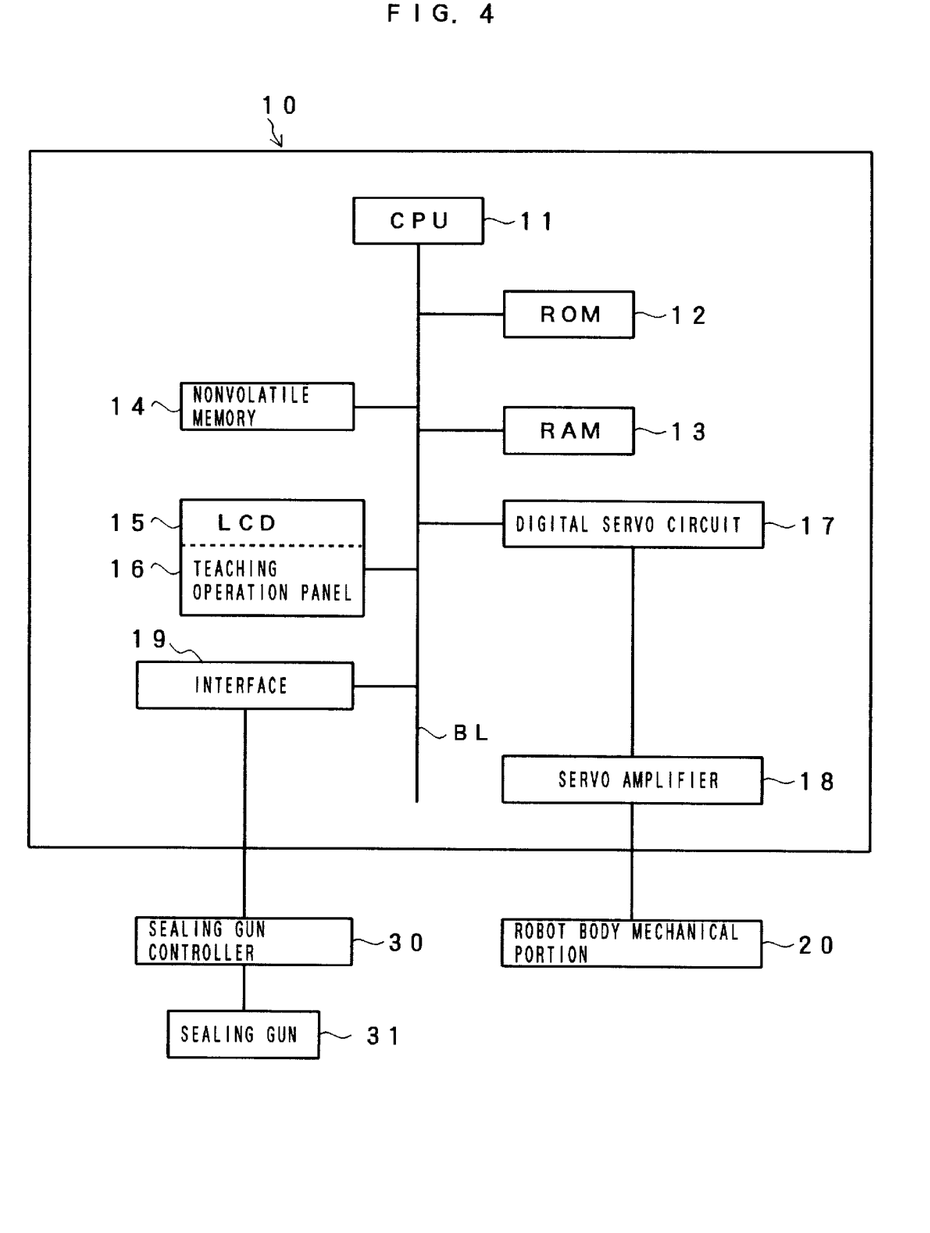
FIG. 4 is a block diagram of a control system of a sealing robot for carrying out the present invention.

FIG. 4 is a block diagram of a robot control system for performing stitch machining of the present invention. A robot controller 10 has a micro processor 11 as a central processing unit (hereinafter referred to as "CPU") for controlling the whole system. The CPU 11 are connected through a bus line BL to a memory 12 in the form of ROM, a memory 13 in the form of RAM, a nonvolatile memory 14, a teaching operation panel 16 with a liquid crystal display 15, a digital servo circuit 17 connected through a servo amplifier 18 to a servomotor of a mechanical section 20 of a welding robot body, and an interface 19 connected to a sealing gun controller 30. The sealing gun controller 30 is connected to a sealing gun 31 attached to a wrist at the distal end of an robot arm, and sealant is applied to a workpiece to be machined from the sealing gun 31.

The ROM 12 stores a variety of system programs for the CPU 11 to control the robot body 20, the sealing gun controller 30 and the robot controller 10 itself. A program for performing stitch machining of the present invention is also stored in the ROM 12. The RAM 13 is provided as a memory for temporary storage of data and operation.

First, the distance n1 of the on-section in which sealant is to be applied and the distance n2 of the off-section in which sealant is not to be applied are set and stored in a register using the teaching operation panel 16 or a manual inputting panel not shown. When the K-cycle stitch function, the automatic end point adjusting function or the continuous stitch function is to be effected, such function is set effective, using the teaching operation panel 16 or the manual inputting panel. When the K cycle stitch function is set effective, the number K of on/off cycles is also set.

Figure 1:
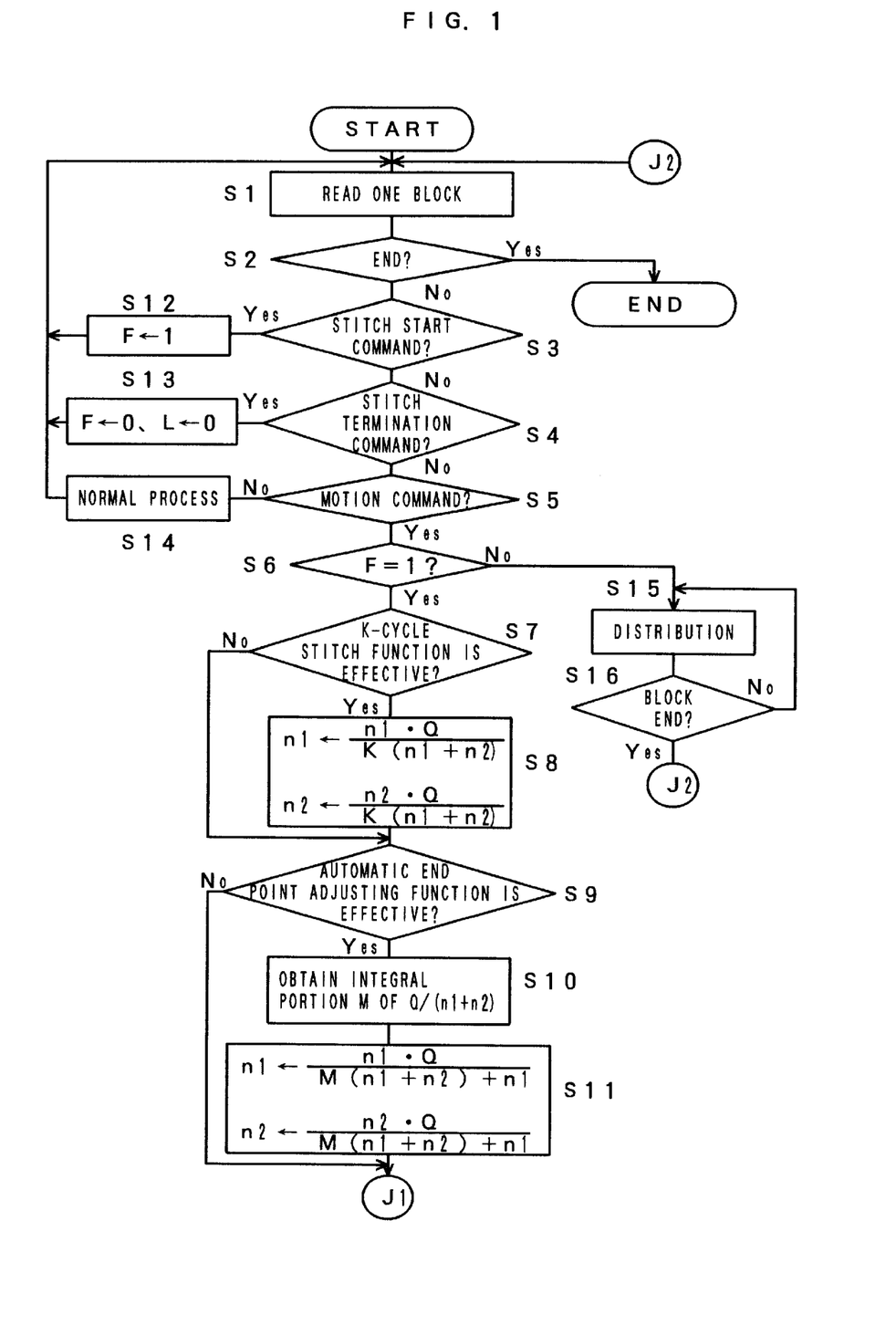
FIG. 1 is a part of a flowchart of processing for stitch machining to be executed by a robot controller according to an embodiment of the present invention.
Figure 2:
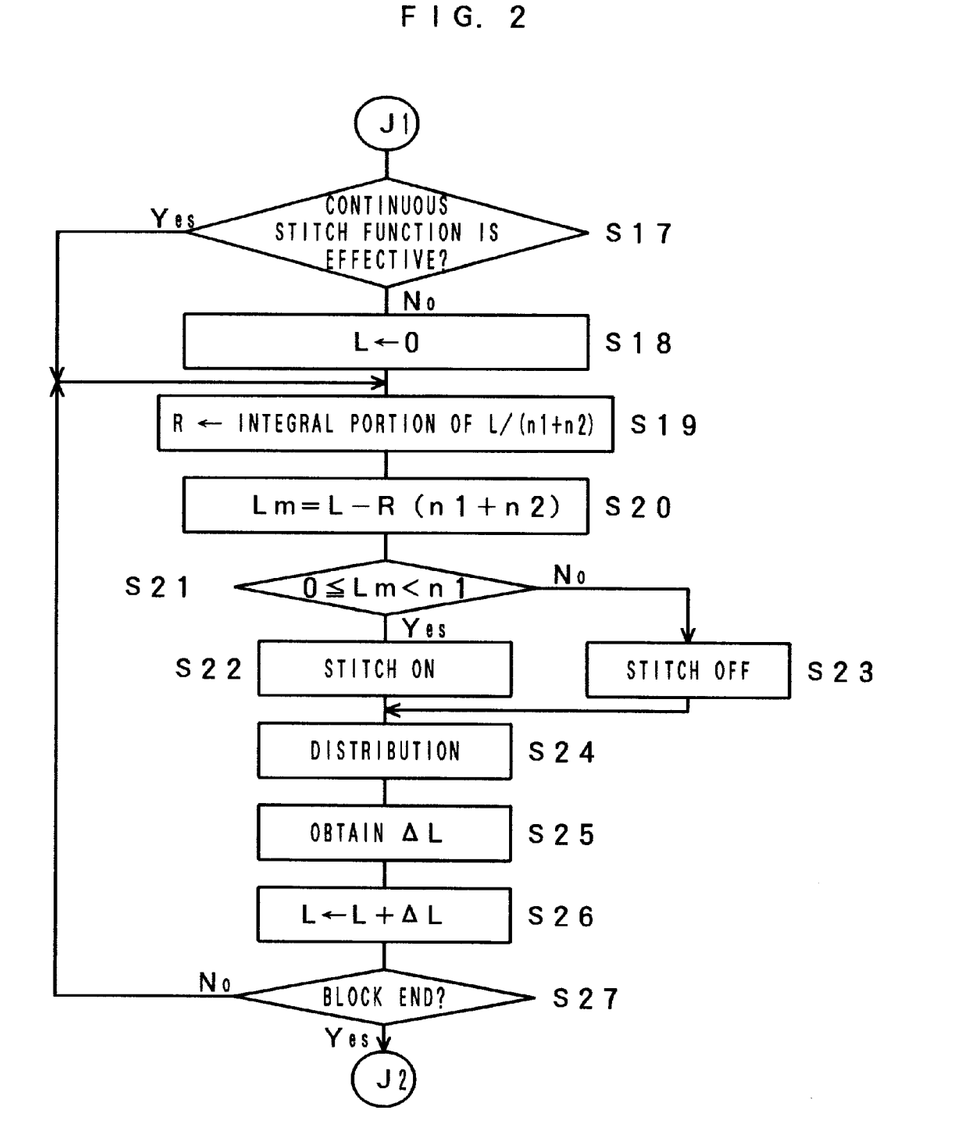
FIG. 2 is a continuation of the flowchart.

When the taught program is executed, the CPU 11 of the robot controller 10 executes processing procedure shown in a flowchart of FIGS. 1 to 2. It is to be noted that in the taught program, a stitch start command is programmed before a block to start the stitch machining, and a stitch termination command is programmed in a block following a block to complete the stitch machining.

The CPU 11 reads one block from the taught program (Step S1), and judges whether or not a command in that block is a program end command (Step S2). If it is not a program end command, the CPU 11 judges whether or not it is a stitch start command, whether or not it is a stitch end command, and whether or not it is a motion command (Steps S3, S4, and S5). If it is none of those commands, the CPU 11 performs processing designated by that block as in conventional control (Step S14), and reads the next block (Step S1). Those actions are repeated thereafter, and when a motion command is read, the procedure proceeds from Step S5 to Step S6, and it is judged whether a flag F is set to "1" or not. This flag F is set to "1" by the stitch start command, reset to "0" by the stitch termination command and maintained as "1" during stitch machining, as will be described later. If the flag F is not "1", the motion command is distributed to servo motors for respective axes of the robot. When the distribution of the motion command in the present block is completed (Steps S15 and S16), the procedure returns to Step S1. The robot is driven to move the sealing gun 31 attached to the wrist at the distal end of the robot arm and when the sealing gun 31 is positioned at a start position of the stitch machining, a stitch start command programmed in the taught program is read (Step S3). Then, the flag F is set to "1" (Step S12) and the next block is read.

Since a motion command for performing stitch machining is programmed after the stitch start command in the taught program, the procedure proceeds to Step S6 through Steps S1 to S5, and it is judged whether or not the flag F is set to "1". When the flag F is set to "1" (in this time, the flag has been set to "1") it is judged whether or not the K-cycle stitch function is set effective (Step S7) and whether or not the automatic end point adjusting function is set effective (Step S9). If the K-cycle stitch function is made effective, operations of the equations (8) and (9) as described are executed using the distances n1 and n2 of on- and off sections and the number K of on/off cycles which have been already set, and an amount Q of the motion command which is read on the present block, to obtain adjusted distances n1 and n2 of on- and off-sections so that K cycles of application and non-application of sealant are completed in the traveling section designated by the present block. These adjusted distances of on- and off-sections are stored in the register for storing the distances of on- and off-sections (Step S8).

In the case where the ratio a is set instead of setting the distances n1 and n2 of on- and off-sections, the equations (12) and (11) are substituted for the equations (8) and (9) at Step S8.

If the automatic end point adjusting function is set effective (Step S9), the amount Q of the motion command read on the present block is divided by the distance (n1+n2) of the on/off cycle stored in the register, and an integral portion M of the quotient of the division is obtained. Then, the operations of the equations (4) and (5) as described are executed using the integral portion M, the amount Q of the motion command and the distances n1 and n2 of on- and off-sections stored in the register to obtain renewed distances n1 and n2 of on- and off-sections and update the register for storing the distances of on- and off-sections.

Next, it is judged whether or not the continuous stitch function is set effective (Step S17). If it is not set effective, a register for storing a travel distance L of the sealing gun 31 (a travel distance of the robot) from the start of the stitch machining is set to "0" (Step S18), and the procedure proceeds to Step S19. If the continuous stitch function is set effective, the procedure proceeds to Step S19 without setting the register for storing the travel distance L to "0". It is to be noted that the register for storing the travel distance L is set to "0" by an initial setting when power is turned on for the robot controller 10.

The travel distance L is divided by the distance (n1+n2) of the on/off cycle, i.e., the sum of the distance n1 of an on-section and the distance n2 of an off-section stored in the register, and an integral portion of the quotient of the division is stored in a register R (Step S19). Then, a value Lm is obtained by subtracting the product of the integer stored in the register R and the distance (n1+n2) of the on/off cycle from the travel distance L (Step S20). The value Lm is in the range of $0 \leq Lm < (n1+n2)$. Specifically, the integer stored in the register R is a integral portion of the quotient when the travel distance L is divided by the distance of the on/off cycle (n1+n2), so that when the product of the integer and the distance (n1+n2) of the on/off cycle is subtracted from the travel distance L, the remainder is smaller than the distance (n1+n2) of the on/off cycle. Thus, the value Lm represents a travel distance from a start of application of sealant in the present on/off cycle of the distance (n1+n2). The value Lm will be hereinafter referred to as a travel distance in the cycle.

It is judged whether or not the distance Lm in the cycle is within the range of $0 \leq Lm < n1$, i.e., whether or not the distance Lm in the cycle is within the on-section of the distance n1 (Step S21). If the travel distance Lm is smaller than the distance n1 to be in the on-section, a stitch-on command is outputted through the interface 49 to the sealing gun controller 30 to make the sealing gun 31 project sealant (Step S22). Then, the motion command in the present block is distributed to respective shafts of the robot to thereby make the robot move (Step S24). Then, the travel distance $\Delta L$ in the present distribution period is obtained (Step S25) and added to the register for storing the travel distance L to update the travel distance L (Step S26). Then, it is judged whether or not the distribution has been completed up to a position (travel distance) Pe designated by the present block (Step S27). If the motion command has not been distributed up to the designated position Pe, the procedure returns to Step S19, and the processing of Step S19 and the following steps is performed in each distribution period, repeatedly.

In repeatedly performing the processing of Steps S19 to S27, when the travel distance Lm in the cycle becomes equal to or larger than the distance n1 of the on-section, the procedure proceeds from Step S21 to Step S23, where a stitch-off command is send to the sealing gun controller 30 to stop the projection of sealant from the sealing gun 31 (Step S23). Then, the processing of Step S24 and the following steps is performed, so that the robot (sealing gun) moves but sealant is not applied to the workpiece to be machined. The processing of Steps S19 to S27 is thereafter performed repeatedly, so that application of sealant in the on-section of the distance n1 and non-application of sealant in the off-section of the distance n2 are performed cyclically along the robot traveling path, as shown in FIGS. 5b to 5g.

When the motion command has been outputted up to the end point Pe designated by the present block, the procedure returns to Step S1, reads the next block and performs the above described processing from Step S1. If a stitch end command is not read and a motion command is subsequently read, the flag F remains set to "1" at Step S6, so that the processing of Step S7 and the following steps is performed. If it is judged at Step S17 that the continuous stitch function is not set effective, the travel distance L from the start of the stitch machining is set to "0" (Step S18) and the processing of Step S19 and the following steps is performed. Therefore, sealant is applied from the start point of the present block, as shown in FIGS. 5e to 5g.

If the continuous stitch function is set effective, the register for storing the travel distance L from the start point Ps of the block in which stitch machining has been started under the stitch start command is not reset to "0", and the processing of Step S19 and the following steps is performed. As a result, stitch machining is continuously performed over a junction of the blocks, as shown in FIG. 5d.

If the K-cycle stitch function and the automatic end point adjusting function are both set effective, the distances n1 and n2 of on- and off-sections are adjusted by the K-cycle stitch function so that the motion amount Q designated by the motion command in one block is completed by K cycles of on- and off-sections, and further, those adjusted distances n1 and n2 of on- and off-sections are adjusted by the automatic end point adjusting function so that the end point of the block coincides with the end of the on-section. Thus, it is possible to make both the K-cycle stitch function and the automatic end point adjusting function effective. However, if at least one of the K-cycle stitch function and the automatic end point adjusting function is set effective and in addition, the continuous stitch function is set effective, neither the K-cycle stitch function nor the automatic end point adjusting function effects normally. In the K-cycle stitch function and the automatic end point adjusting function, the distances n1 and n2 of on- and off-sections are determined based on the amount of movement Q in one block. In contrast thereto, in the continuous stitch function, the on-section of the distance n1 and the off-section of the distance n2 are switched over at Steps S19 to S21 based on the travel distance L from the start of stitch machining. Therefore, if the K-cycle stitch function and/or the automatic end point adjusting function are set effective together with the continuous stitch function, the K-cycle stitch function or the automatic end point adjusting function does not work effective.

The above described processing is performed repeatedly, and when it is judged at Step S4 that a stitch end command is read, the flag F is set to "0" and the register for storing travel distance L is set to "0" (Step S13), and the procedure returns to Step S1. In the subsequent period, as the flag F is set to "0", if a motion command is read, the procedure proceeds from Step S6 to Step S15, so that stitch machining is not performed. If another stitch start command is programmed in the taught program, the processing for the stitch machining as described is started again.

Figure 3:
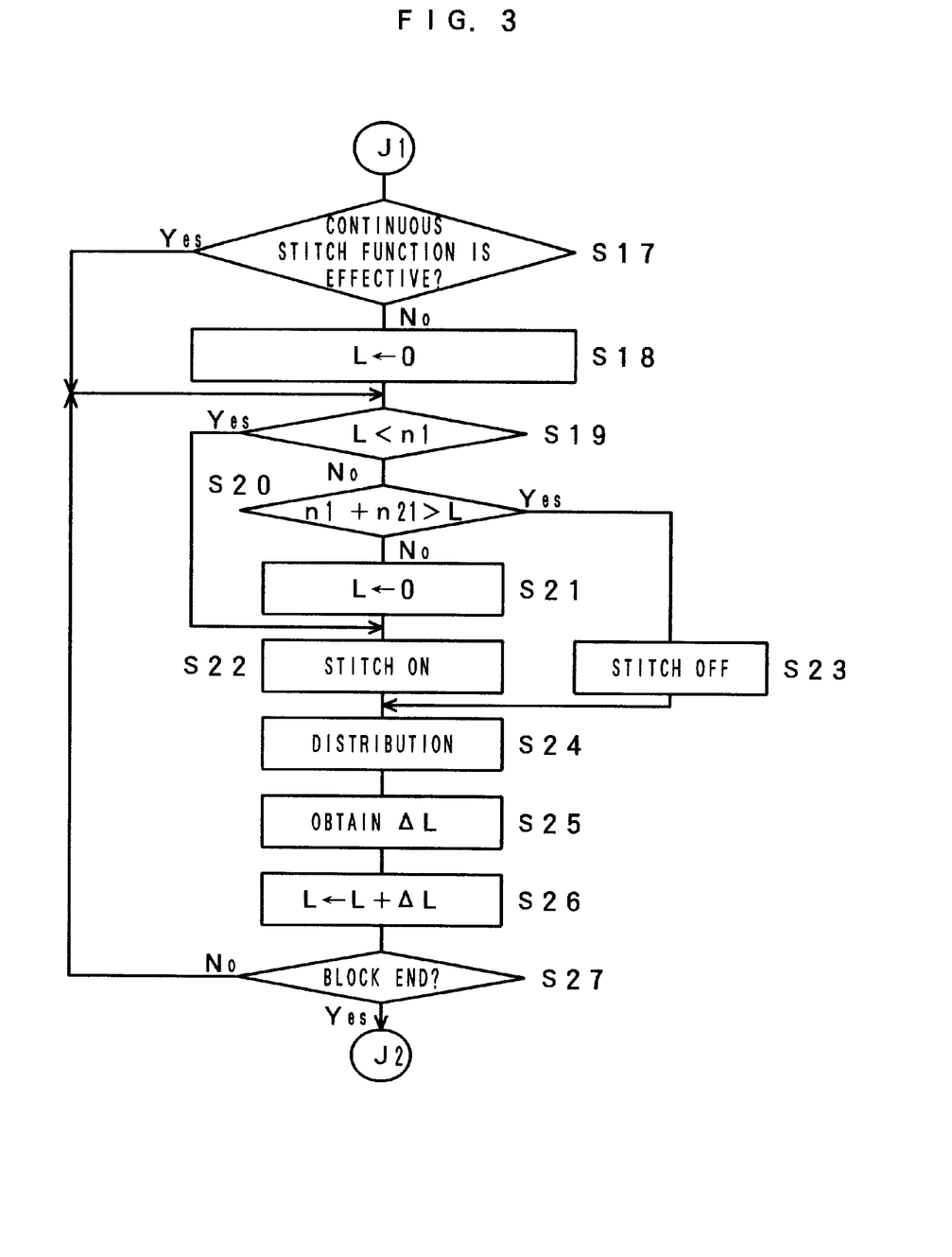
FIG. 3 is a flowchart to be substituted for FIG. 2 according to another embodiment.

FIG. 3 is a flowchart of another embodiment, which may be substituted for the flowchart of processing for the stitch machining shown in FIG. 2. The procedure differs from that of FIG. 2 in that the processing of Steps S19 to S21 is replaced by the processing of Steps S19' to S21'. Other than these steps, the procedure is the same as that shown in FIGS. 1 to 2. In this embodiment, it is judged whether or not the travel distance L is smaller than the distance n1 of the on-section (Step S19'). If the travel distance L is smaller than the distance n1, the procedure proceeds to Step S22 to output the stitch-on command. If the travel distance L is equal to or larger than the distance n1 of the on-section, it is judged whether or not the travel distance L is smaller than the sum (n1+n2) of the distances n1 and n2 of the on- and off-sections (Step S20'). If the travel distance L is smaller than the sum (n1+n2), the stitch-off command is outputted (Step S23). If it is judged at Step S20' that the travel distance L is equal to or larger than the sum (n1+n2) of the distances of on- and off-sections, the register for storing the travel distance L is set to "0" and the procedure proceeds to Step S22 to output the stitch-on command. By the processing shown in FIG. 3, the stitch machining equivalent to that by the processing shown in FIG. 2 can be performed.

It is to be noted that the set or calculated distances n1 and n2 of on- and off-sections, the travel distance L of the robot from the start of stitch machining, the Flag F, information about setting of the K-cycle stitch function, the automatic end point adjusting function and the continuous stitch function, and the current block number of the taught program are stored in the nonvolatile memory, so that the stitch machining can be resumed based on data stored in the nonvolatile memory after a temporary stop or an emergency stop.

FIG. 5e shows a junction of blocks in the case where the K-cycle stitch function, the automatic end point adjusting function and the continuous stitch function are all set ineffective. The position in the on/off cycle at which a first block terminates is not definitely determined. Therefore, the end point of the first block may positioned in the on-section (where sealant is applied) or in the off-section (where sealant is not applied), depending on cases.

FIG. 5f shows the stitch machining in the case where the K-cycle stitch function is set effective. The stitch machining is performed so that K cycles (three cycles in the case of FIG. 5f) of the on/off sections are repeated in traveling each block. The end point Pe of each block positions in an end of the off-section where sealant is not applied.

FIG. 5g shows the stitch machining in the case where only the automatic end point adjusting function is set effective. An end point Pe of each block coincides with an end of the on-section (where sealant is applied). Thus, a start point Ps coincides with a start of the on-section where sealant is applied, and the end point Pe coincides with an end of the on-section where sealant is applied. If the automatic end point adjusting function and the K cycle stitch function are set effective, the stitch machining is performed so that each block comprises K cycles of on- and off-sections plus another on-section (n1).

FIG. 5d shows the stitch machining in the case where the continuous stitch function is set effective. The stitch machining is performed continuously over a junction of blocks.

By setting only distances of machining and non-machining, the stitch machining alternately executing machining of the set distance and non-machining of the set distance is performed, so that it is not necessary to teach a large number of points at which machining and non-machining are switched over, as in conventional cases. Further, distances of machining and non-machining can be easily changed and the machining and the non-machining can be accurately continued. Furthermore, since the motion command is not for a movement of a short distance between the points at which machining and non-machining are switched over, there will not happen cases in which processing of planning a motion path by the robot controller is not performed in time, so that desired machining and non-machining distances can be set.

We claim:

1. A stitch machining method for intermittently machining a work piece along a travel path of an end effector attached to an industrial robot by controlling the end effector with a robot controller, said method comprising:

setting a machining distance and non-machining distance for the intermittent machining with a cycle of machining and non-machining, to said robot controller; and alternately performing the machining of the set machining distance and the non-machining of the set non-machining distance in accordance with a travel distance of said end effector from a beginning of the stitch machining.

2. A stitch machining method by an industrial robot according to claim 1, said alternately performing the machining includes alternately performing said machining and said non-machining for each block of a motion command in an operation program.

3. A stitch machining method by an industrial robot according to claim 1, said alternately performing the machining includes alternately performing said machining and said non-machining continuously from a beginning to an end of the stitch machining for a plurality of blocks of motion commands in an operation program.

4. A stitch machining method by an industrial robot according to claim 1, further comprising storing status of the stitch machining, said alternately performing the machining includes resuming the stitch machining based on the status of the stitch machining stored in said storing after a temporary stop or an emergency stop.

5. A stitch machining method for intermittently machining a workpiece along traveling path of an end effector attached to an industrial robot by controlling the end effector with a robot controller, said method comprising:

setting a machining distance and a non-machining distance for the intermittent machining with a cycle of machining and non-machining, to said robot controller;

adjusting the set machining distance and the set non-machining distance so that start and end points of a block of a motion command in an operation program coincides with start end points of said machining, respectively; and alternately performing the machining of the machining distance adjusted in said adjusting and the non-machining of the non-machining distance adjusted in said adjusting in accordance with a travel distance of the end effector from a beginning of the stitch machining.

6. A method of stitch machining by an industrial robot according to claim 5, further comprising storing a status of the stitch machining, said alternately performing the machining includes resuming the stitch machining based on the status of the stitch machining stored in said storing after a temporary stop or an emergency stop.

7. A stitch machining method intermittently machining a workpiece along a traveling path of an end effector attached to an industrial robot by controlling the end effector with a robot controller, said method comprising:

setting a machining distance and a non-machining distance for the intermittent machining with a cycle of machining and non-machining and also the number of cycles of the intermittent machining, to said robot controller;

adjusting the machining distance and the non-machining distance set in said setting a machining distance so that movement in each block of an operation program taught to the industrial robot is completed with the set number of cycles of the machining and the non-machining; and alternately performing the machining of the machining distance adjusted in said adjusting and the non-machining of the non-machining distance adjusted in said adjusting in accordance with a travel distance of the end effector from a beginning of the stitch machining.

8. A method of stitch machining by an industrial robot according to claim 7, further comprising storing status of the stitch machining, said alternately performing includes a step of resuming the stitch machining based on the status of the stitch machining stored in said storing after a temporary stop or an emergency stop.

9. A stitch machining method intermittently machining a workpiece along a traveling path of an end effector attached to an industrial robot by controlling the end effector attached to an industrial robot by controlling the end effector with a robot controller, said method comprising:

setting a ratio of a machining distance to a non-machining distance and the number of cycles of machining and non-machining, to said robot controller:

(b) adjusting said ratio to obtain the machining distance and the non-machining distance so that movement in each block of an operation program taught to the industrial robot is completed with the number of cycles of machining and non-machining set in said setting; and alternately performing the machining of the machining distance obtained in said adjusting and the non-machining of the non-machining distance obtained in said adjusting in accordance with a traveling distance of the end effector from a beginning of the stitch machining.

10. A method of stitch machining by an industrial robot according to claim 9, further comprising storing a status of the stitch machining, said alternately performing including a step of resuming the stitch machining based on the status of the stitch machining stored in said storing after a temporary stop or an emergency stop.

11. A method of stitch machining by an industrial robot according to claim 1, wherein said stitch machining is one of sealing for applying sealant on a workpiece, welding, or coating for applying coating material on a workpiece.

12. Said method of claim 7, further comprising adjusting the machining and non-machining distances while maintaining a same ratio of set machining and set non-machining distance.

* * * * *